G. J. WALTER.
TRACTION DEVICE FOR VEHICLE WHEELS.
APPLICATION FILED APR. 18, 1912.
1,053,893. Patented Feb. 18, 1913.
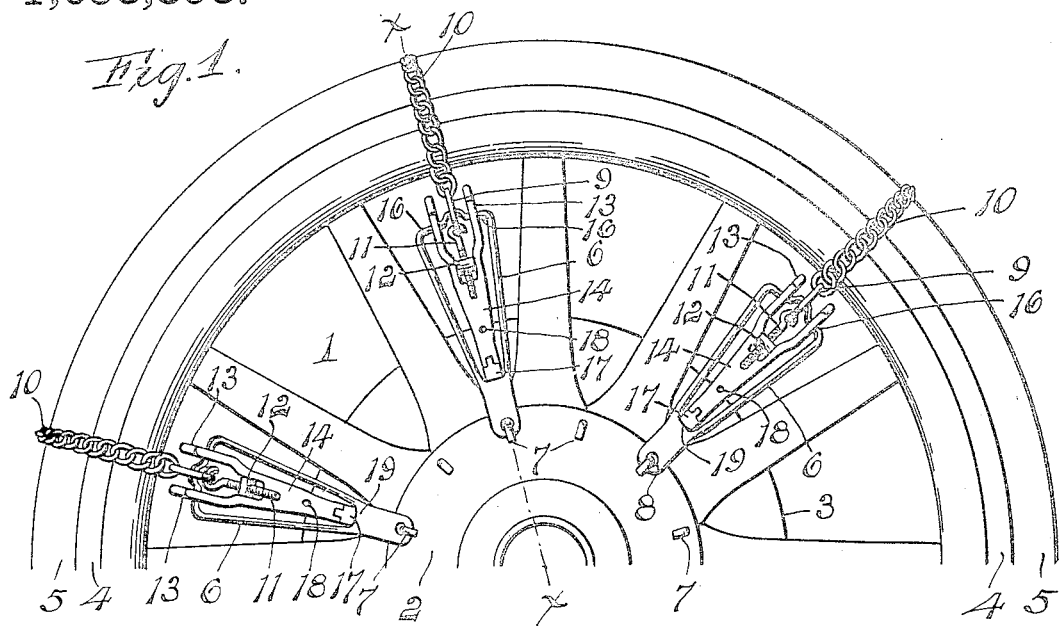
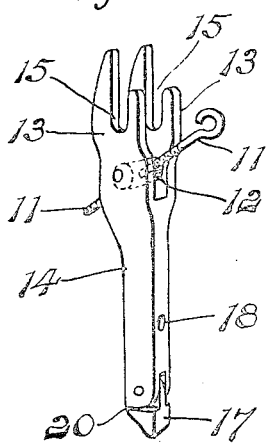
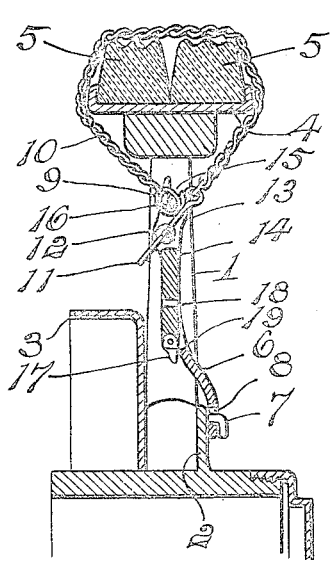
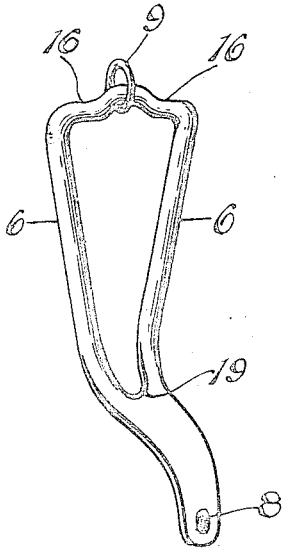
Witnesses
Chas. William Stauffiger
Anna M. Dow
Inventor
Gotthold J. Walter
By Barthel & Barthel
Attorneys

UNITED STATES PATENT OFFICE.

GOTTHOLD J. WALTER, OF DETROIT, MICHIGAN.

TRACTION DEVICE FOR VEHICLE-WHEELS.

1,053,893.

Specification of Letters Patent. Patented Feb. 18, 1913.

Application filed April 18, 1912. Serial No. 691,614.

*To all whom it may concern:*

Be it known that I, GOTTHOLD J. WALTER, a citizen of the United States of America, residing at Detroit, in the county of Wayne and State of Michigan, have invented certain new and useful Improvements in Traction Devices for Vehicle-Wheels, of which the following is a specification, reference being had therein to the accompanying drawings.

This invention relates to traction device for vehicle wheels and its object is to provide a simple and convenient construction which will permit of a very quick manipulation of the device to attach and detach the same and to provide certain other new and useful features in the construction and arrangement of parts, the invention consisting in the matters hereinafter set forth and more particularly pointed out in the claims reference being had to the accompanying drawing in which—

Figure 1 is a side elevation of a portion of a wheel with a plurality of traction devices embodying the invention in place thereon; Fig. 2 is a transverse section of the same on the line *x—x* of Fig. 1; Fig. 3 is a perspective view of the clamping lever detached; and Fig. 4 is a perspective view of the loop member detached.

As shown in the drawing, 1 is a motor vehicle wheel of the usual construction having a hub flange 2 at one side of the spokes, a brake drum 3 at the inner side thereof and a channel rim 4 holding a pair of solid rubber tires 5. It will be understood that the wheel to which the invention is applied may be of any desired construction and provided with a solid rubber tire as shown, or with a pneumatic tire.

The attachment embodying the invention consists of a suitably shaped fulcrum member 6 in the form of a loop adapted to be placed between adjacent spokes of the wheel and to be attached to the outer side of the flange 2 at its lower end by means of a hook, bolt or similar device 7 projecting from the flange and engaging an opening 8 in the end of the loop. Secured to the upper end of the loop in any suitable manner as by a ring 9, is a chain 10 adapted to be passed upward over and around the rim 4 and tires 5. The opposite end of this chain is attached to a rod 11 having an eye in one end and screwthreaded at its opposite end to engage a block 12 which is pivoted between the arms 13 of the forked end of a clamping lever 14. This clamping lever is formed at its upper end with a notch 15 in the end of each arm 13, said notches forming a transverse bearing to engage the horizontal portion 16 of the fulcrum loop 6 at each side of the place of attachment of the chain 10 to the loop.

Pivotally attached to the lower end of the lever 14 is a gravity dog 17 and the length of the lever 14 is such that when engaged with the horizontal portion 16 of the loop it will just swing through the loop, the dog turning upward to allow the lever to pass through. A hole 18 is provided in the lever near its lower end to receive a bar or other device by means of which the lever may be turned upon its point of engagement 16 with the loop. When the lever 14 has been turned through the loop the gravity dog 17 will drop down behind the lower end 19 of the loop and thus prevent the backward turning of the lever, said dog being prevented from turning in one direction by means of shoulders 20 on the dog and end of the lever. The bearing slots 15 of the lever 1 when engaged with the portion 16 of the loop, form the pivot upon which the lever turns and as the block 12 to which the end of the chain 10 is attached, is secured within the fork below the pivot of the lever, when said lever is turned downward the chain will be drawn tightly about the rim and tires of the wheel to firmly hold the chain in place. The length of the chain may be quickly adjusted by turning the rod 11 and adjusting it through the block 12.

One or more of these traction devices may be applied to the wheel as necessity requires and the vehicle may be run with these devices in place upon the wheel or they may be simply applied to give traction to the wheel when such extra traction is required and may then be removed. Each device is quickly attached to the wheel as it is only necessary to hook the loop member over the hook 7, pass the chain around the tire, engage the forked end of the lever with the upper end of the loop, and by means of a suitable bar applied to the opening 18 turn the lever downward through the loop to engage the dog 17 behind the lower closed end 19 of the loop.

Obviously any flexible traction member may be substituted for the chain 10 and changes in the construction and arrangement of parts may be made without departing from the spirit of my invention. I therefore do not wish to limit myself to the particular form and construction shown.

Having thus fully described my invention what I claim is—

1. In a device of the character described, the combination of a fulcrum member adapted to be detachably secured at one end to the hub portion of a wheel and extend outwardly between the spokes of said wheel, a flexible traction member attached at one end to the outer end of said fulcrum member and adapted to be passed around a rim and tire of a wheel transversely thereof, a lever to engage and turn upon the outer end of the fulcrum member, and an adjusting member carried by the lever to which the opposite end of the traction member is attached.

2. In a device of the character described, the combination of a loop member adapted to be detachably secured at one end to the hub portion of a wheel to lie in the plane of the spokes thereof, a traction member attached at one end to the outer end of the loop and adapted to be passed transversely around the rim and tire of the wheel, a lever having a bearing end to engage and turn upon the outer end of the loop, and a member for securing the opposite end of the traction member to said lever adjustable longitudinally and pivotally attached to said lever at a distance from the point of engagement of the lever with the loop.

3. In a device of the character described, the combination of a flexible traction member adapted to be passed around a rim and tire of a wheel transversely thereof, a loop adapted to be detachably attached at one end to the hub portion of a wheel to lie between the spokes thereof, one end of said traction member being attached to the outer end of said loop, a forked lever having bearings at one end to engage the outer end of the loop, means for adjustably attaching the opposite end of the traction member to said lever intermediate the ends of said lever, and means on the end of said lever to engage said loop for holding the lever in the position to which it is turned.

4. In a device of the character described, the combination of a loop, a flexible traction member attached at one end to the outer end of the loop, a lever to engage and turn upon the outer end of the loop and swing through said loop, means for attaching the opposite end of the traction member to the lever intermediate the ends of said lever, and means carried by the lever for engaging the loop and holding the lever when turned through the loop.

5. In a device of the character described, the combination of a loop, a flexible traction member attached at one end to the outer end of the loop, a lever attached to the opposite end of the traction member intermediate its ends and provided with bearings at its end to engage the end of the loop and turn thereon through the loop, and a gravity dog carried by the free end of the lever to engage the inner end of the loop and hold the lever turned therethrough.

6. In a device of the character described, the combination of a loop adapted to be detachably attached at one end to the hub portion of a wheel, a traction member attached at one end to the outer end of the loop and adapted to be passed around a rim and tire transversely thereof, a forked lever having bearing slots at one end to receive the outer end of the loop and turn thereon through the loop, a block pivoted within the fork of the lever and having a screwthreaded opening, a screwthreaded rod engaging said opening and provided with an eye at one end for the attachment at the end of the traction member, and a gravity dog on the inner end of the lever to engage the inner end of the loop.

In testimony whereof I affix my signature in presence of two witnesses.

GOTTHOLD J. WALTER.

Witnesses:
LEWIS E. FLANDERS,
ANNA M. DORR.